(12) United States Patent
Zhang et al.

(10) Patent No.: US 9,167,537 B2
(45) Date of Patent: Oct. 20, 2015

(54) METHODS AND APPARATUS FOR DLTPC REJECTION IN DOWNLINK WINDUP MODE

(71) Applicant: QUALCOMM Incorporated, San Diego, CA (US)

(72) Inventors: Wei Zhang, San Diego, CA (US); Ravi Gopalan, San Diego, CA (US); Sharif Ahsanul Matin, San Diego, CA (US); Ning He, San Diego, CA (US); Prashant Udupa Sripathi, San Jose, CA (US); Nitin Kasturi, Saratoga, CA (US); Messay Amerga, San Diego, CA (US); Mohammad J. Al-Saleh, San Diego, CA (US); Krishna Chaitanya Mukkera, San Diego, CA (US); Vijay Marwah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 13/763,287

(22) Filed: Feb. 8, 2013

(65) Prior Publication Data

US 2013/0324180 A1 Dec. 5, 2013

Related U.S. Application Data

(60) Provisional application No. 61/655,958, filed on Jun. 5, 2012.

(51) Int. Cl.
*H04W 52/00* (2009.01)
*H04W 52/24* (2009.01)
*H04W 52/56* (2009.01)
*H04W 52/14* (2009.01)
*H04W 52/22* (2009.01)

(52) U.S. Cl.
CPC .............. *H04W 52/24* (2013.01); *H04W 52/56* (2013.01); *H04W 52/146* (2013.01); *H04W 52/221* (2013.01)

(58) Field of Classification Search
CPC .............................. H04W 52/24; H04W 52/14
USPC .................. 455/522, 69, 452.2, 67.11, 452.1, 455/67.13, 500, 501, 127.1, 115.1, 343.1; 370/328, 335
See application file for complete search history.

(56) References Cited

U.S. PATENT DOCUMENTS 8,150,447 B2 * 4/2012 Kazmi et al. ................... 455/522
2004/0166884 A1 8/2004 Oh et al.

(Continued)

FOREIGN PATENT DOCUMENTS

EP 1672814 A1 6/2006

OTHER PUBLICATIONS

International Search Report and Written Opinion—PCT/US2013/044162—ISA/EPO—Aug. 7, 2013.

*Primary Examiner* — John J Lee
(74) *Attorney, Agent, or Firm* — Charles Chesney

(57) ABSTRACT

Disclosed are methods and apparatus for rejecting unreliable downlink (DL) transmit power control (TPC) commands in windup mode. In one aspect, the method includes receiving by a user equipment (UE) a plurality of DLTPC commands from a base station, analyzing on one or more transmitted uplink (UL) TPC commands, detecting a windup mode based on the one or more DLTPC and ULTPC commands, and rejecting one or more DLTPC down commands in the windup mode.

12 Claims, 9 Drawing Sheets

(56) References Cited

U.S. PATENT DOCUMENTS

| | | |
|---|---|---|
| 2006/0160557 A1 | 7/2006 | Chang |
| 2008/0220819 A1 | 9/2008 | Ben-Eli |
| 2009/0086682 A1* | 4/2009 | Kazmi et al. .................. 370/335 |
| 2010/0081469 A1 | 4/2010 | Kazmi et al. |
| 2010/0087219 A1 | 4/2010 | Jonsson et al. |
| 2012/0149424 A1 | 6/2012 | Dawid et al. |
| 2012/0257568 A1* | 10/2012 | Cai et al. ....................... 370/328 |

* cited by examiner

METHODS AND APPARATUS FOR DLTPC REJECTION IN DOWNLINK WINDUP MODE

CLAIM OF PRIORITY UNDER 35 U.S.C. §119

The present Application for Patent claims priority to Provisional Application No. 61/655,958 entitled "Methods and Apparatus for ULTPC Decoding in DL Windup Mode" and filed on Jun. 5, 2012, and assigned to the assignee hereof and hereby expressly incorporated by reference herein.

BACKGROUND

1. Field

Aspects of the present disclosure relate generally to the field of wireless communication, and more particularly, to methods and apparatus for controlling rejection of downlink (DL) Transmit Power Control (TPC) commands in a windup mode.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In UMTS, user equipment's (UE's) transmit power may be controlled by base station (e.g., NodeB) using Downlink (DL) Transmit Power Control (TPC) commands transmitted on a downlink (DL) Dedicated Physical Control Channel (DPCCH). Generally, DLTPC command includes either 0 (power down) or 1 (power up) bits. UE decodes the DLTPC commands and adjusts its transmit power accordingly. In some instances, a large sequence of unreliable DLTPC down commands (0 bits) may cause sudden drop in UE's transmit automatic gain control (TxAGC) to a very low level. Sometimes UE recovers its TxAGC by itself and sometimes it does not, which may cause radio link failure. It has been observed, that this odd behavior, i.e., a large sequence of DLTPC down commands, may occur when the UE is in a windup mode.

Windup mode is a power control behavior in which signal-to-interference ratio estimate (SIRE) of the received signals by the UE is too low to maintain the required Block Error Rate (BLER) of the DL channel transmissions and increasing the NodeB's transmit power does not improve the received signals at the UE. This situation is illustrated in FIG. 1. As shown, windup mode may occur when, for example, UE passes large buildings, which may cause shadowing effect that can makes the NodeB's DL signals weak in that area. Because of the shadowing, increasing NodeB's transmit power does not improve the DL channel SIRE, wastes NodeB's power and causes interference to other UEs. The TPC Down commands (0 bits) are likely caused by the TPC command decoding errors and, therefore, should not have been all rejected given the average DL channel SIRE is still higher than the rejection threshold for Down commands for multiple TPC groups. Accordingly, there is a need to solve this DLTPC decoding issue when the UE is in the windup mode.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed are methods and apparatus for rejecting unreliable downlink (DL) transmit power control (TPC) commands in windup mode. In one aspect, the method includes receiving by a user equipment (UE) a plurality of DLTPC commands from a base station, analyzing on one or more uplink (UL) TPC commands transmitted by the UE to the base station, detecting a windup mode based on the one or more ULTPC commands, and rejecting one or more DLTPC down commands if the windup mode is detected.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
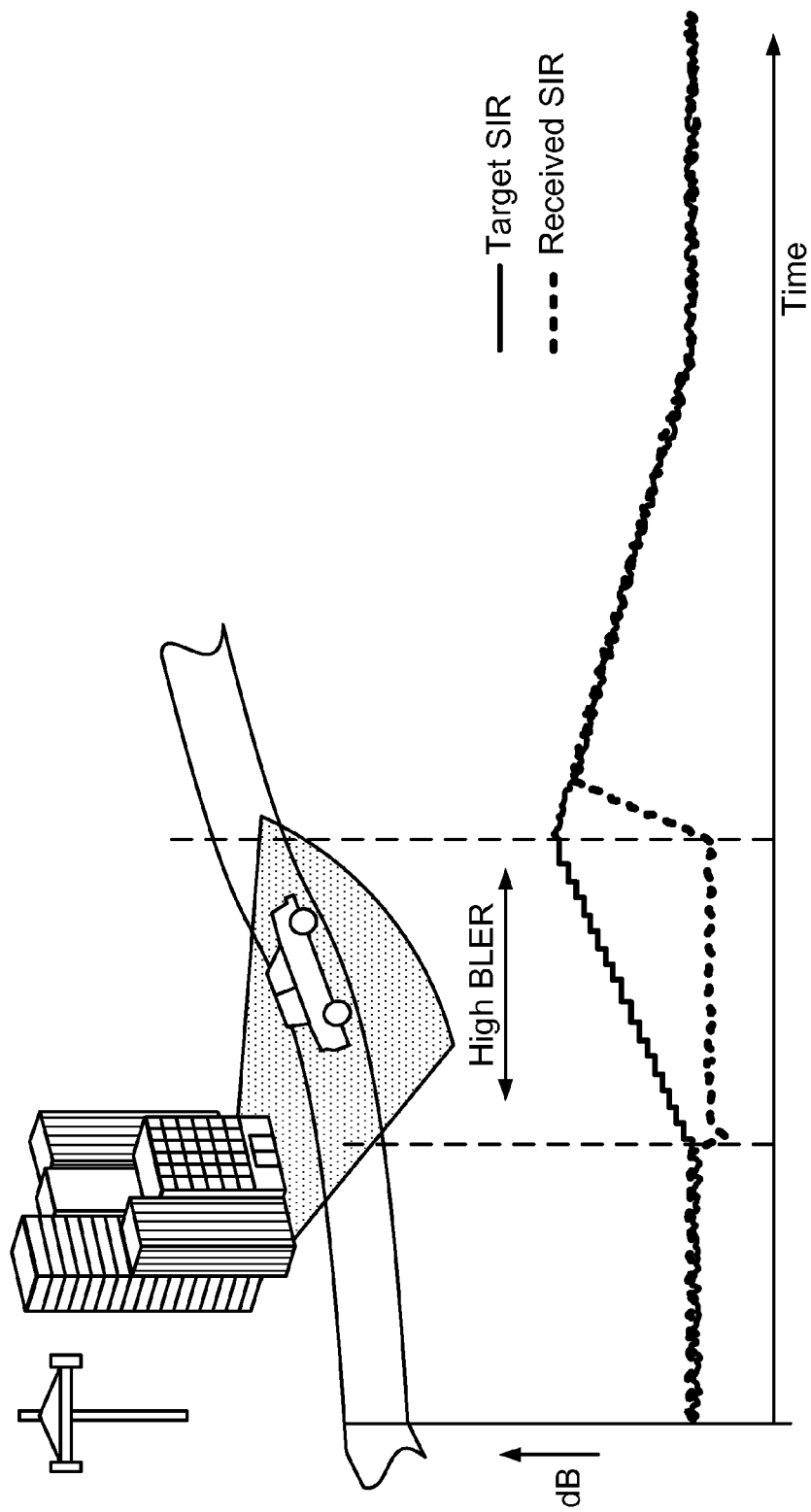
FIG. 1 is a diagram illustrating an example of a windup mode power control behavior.
Figure 2:
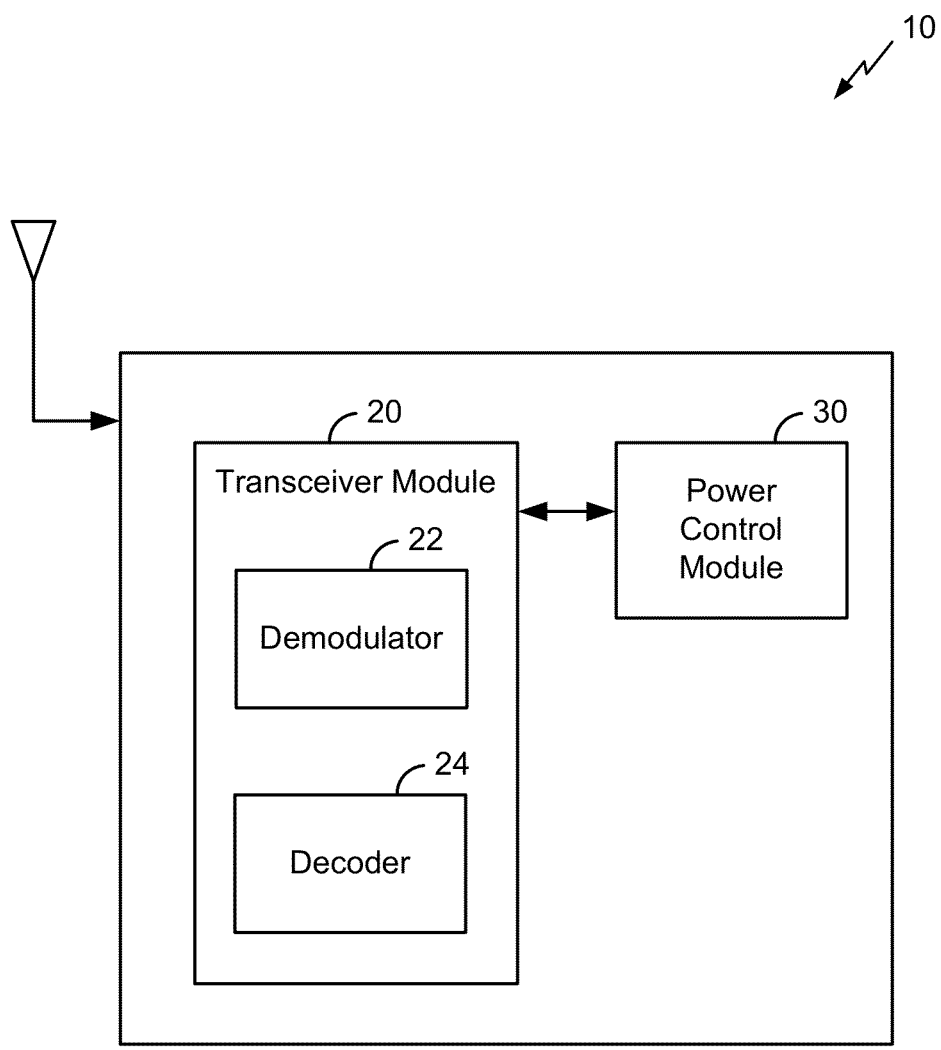
FIG. 2 is a block diagram illustrating an example of a processing system for controlling UE's transmit power according to one aspect.

FIG. 2 a block diagram illustrating a processing system implemented in a UE 10 for rejecting unreliable downlink (DL) transmit power control (TPC) commands from base station (not shown) in windup mode according to one aspect of the invention. The system includes a transceiver module 20 and a power control module 30. The transceiver module 20 may include a RF circuitry for sending/receiving RF signals to/from base stations (e.g., Nodes B). Particularly, the transceiver module 20 is operable to receive DLTPC commands from one or more base station(s) on a downlink (DL) Dedicated Physical Control Channel (DPCCH). The transceiver module 20 includes a demodulator (22) and decoder (24), which respectively demodulate and decode the DLTPC commands. The DLTPC command usually includes a sequence of bits: 0 (i.e., power down) or 1 (i.e., power up). The transceiver module 20 forwards the decoded DLTPC commands to the power control module 30, which is configured to control transmitting power of the UE 10 based on received DLTPC commands.

In one aspect, the power control module 30 is configured to identify when the UE 10 is the windup mode and stop tuning down the UE's transmit power when UE is in the windup mode. In one aspect, the windup mode detection is based on observation of the UL channel. For example, a windup mode may occur when at least in the 40 of the last 45 slots the UE 10 transmitted all ULTPC up commands (all 1 bits) to the NodeB. This means that UE 10 is requesting more power on the DL channel from the NodeB because the DL channel conditions are poor (e.g., the UE is behind a building or in an elevator). Concurrently, the UL channel conditions are poor too, e.g., low SIRE on the UL channel. So the multiple DLTPC down commands (multiple 0 bits) are unlikely to be sent from the NodeB. Instead, DLTPC up commands (more 1 bits) should be expected from the NodeB, just like UE is sending all ULTPC up commands (all 1 bits) to the nodeB. However, DLTPC down commands (all 0 bits) keep being received from the NodeB. These DLTPC down commands are most likely due to the decoding errors caused by poor DL channel conditions and therefore should be not be relied upon in the windup mode. When these conditions occur, the UE may be considered to be in a windup mode. When UE 10 gets out of the windup mode, UE's TxAGC is recovered as it now can hear the DL channel clearly. Therefore, it does not make sense for the UE to reduce the TxAGC based on the unreliable DLTPC down commands in the windup mode.

Thus, in one aspect, the power control module 30 can ensure that target SIR (SIRT) is not increased when the UE 10 enters the windup mode on the DL channel. In another aspect, the power control module 30 may reject unreliable DLTPC down commands in order to prevent the TxAGC of the UE 10 from decreasing UE's transmitter power in response to the unreliable DLTPC down commands from the NodeB, whereby freezing (i.e., maintaining) the UE transmit power at the old power level since the UL conditions cannot be improved either through the increase in the UE transmit power.

Figure 3:
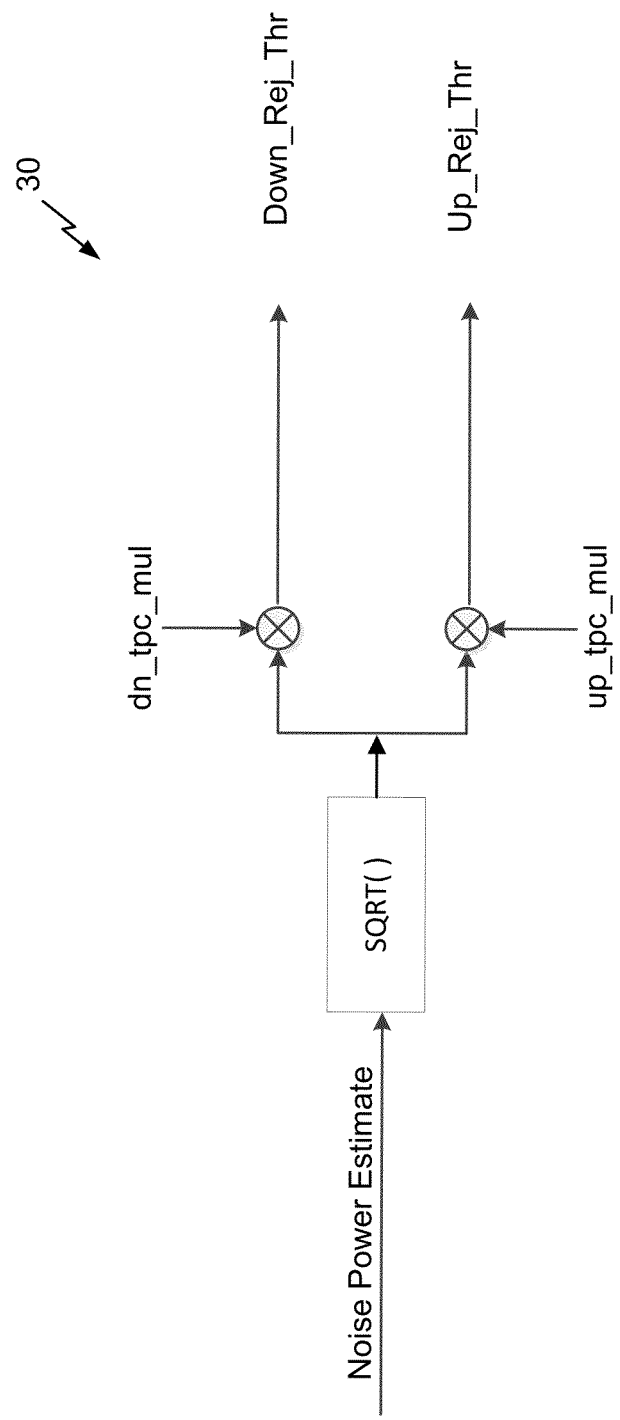
FIG. 3 is a block diagram illustrating an example of a processing system for calculating DLTPC rejection threshold(s) for the windup mode according to another aspect.

FIG. 3 shows an exemplary implementation of a processing system for calculating DLTPC rejection threshold(s) in a windup mode. In one aspect, the processing system may be implemented in the power control module 30 of UE 10 (FIG. 2). In one aspect, the DLTPC rejection threshold(s) may be computed as proportional to the noise amplitude estimate (e.g., square root of the noise power estimate) of DL pilot signals from NodeB. In another aspect, the DLTPC rejection threshold may be calculated from a cumulative noise estimate of pilot signals from several NodeBs in UE's active set (e.g., a TPC group). In one aspect, the calculated noise power estimate may be multiplied by dn_tpc_mul and up_tpc_mul factors to generate separate rejection thresholds for the Up and Down DLTPC commands. These factors may be selected based on the minimum requirement for a DLTPC rejection ratio at some pre-determined conditions and optimized offline in a simulation environment or tuned over time in an adaptive manner based on actual signal decode success/failure measurements in diverse communications environments. Once the Up and Down DLTPC rejection thresholds for the windup mode have been calculated, the power control module 30 may compare the value of the received DLTPC command, while UE in the windup mode, with the computed DLTPC rejection thresholds. In one aspect, the power control module 30 may reject DLTPC down command if the value of the DLTPC command is above the Up DLTPC rejection threshold. In another aspect, the power control module 30 may reject DLTPC up command if the value of the DLTPC command is below the down DLTPC rejection threshold. When DLTPC command is rejected, the power control module 30 may instruct the transceiver module 20 to maintain the UE's transmit power at the old level. When DLTPC command is accepted, the power control module 30 may instruct the transceiver module 20 to adjust UE's transmit power according to the DLTPC command.

In one aspect, the Up and Down DLTPC rejection thresholds may be different even for the same TPC group. For example, tpc_mul values may be different when there is more than one TPC group in an active set, because of the 'up-or-down' combining among different groups. To achieve the balance after combing, the power control module 30 may reject more Down than Up DLTPC commands in the windup mode. In another aspect, power control module 30 may increase the dn_tpc_mul value when DL channel is in windup mode to reject most of the unreliable DLTPC down commands. In one aspect, the power control module 30 may use in the windup mode a dn_tpc_mul value for which the equivalent SIRE for rejecting DLTPC down commands is about −1 dB; however, other values may be used in other aspects.

Figure 4:
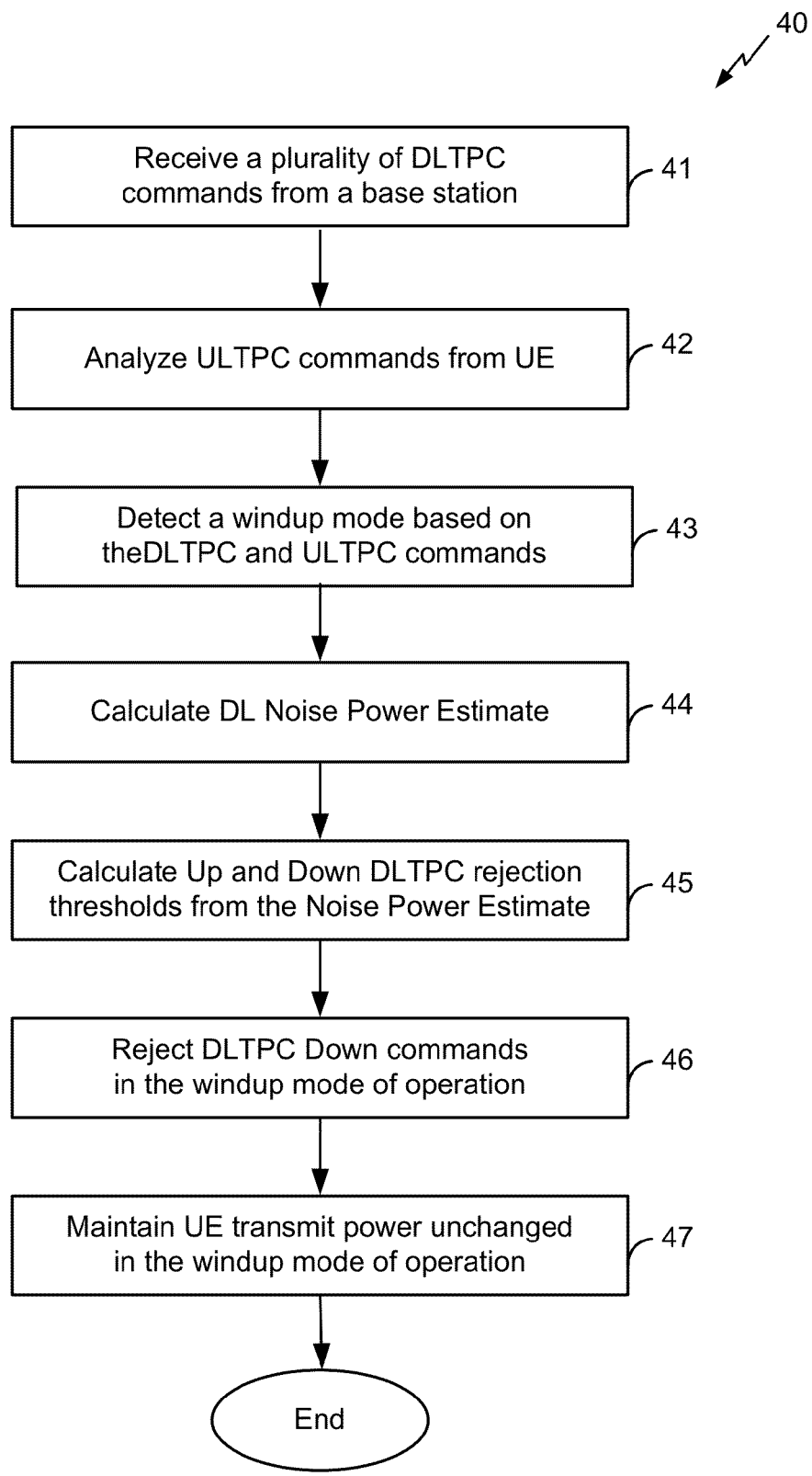
FIG. 4 is a block diagram illustrating an example of a method for controlling UE's transmit power in the windup mode according to one aspect.

FIG. 4 illustrates an example method for controlling UE's transmit power in the windup mode. The method of FIG. 4 may, for example, be implemented in a UE (e.g., UE 10 of FIG. 2). At step 41, the transceiver module 20 receives, demodulates and decodes a plurality of DLTPC commands using demodulator 22 and decoder 24, respectively, and provides the received DLTPC commands to the power control module 30. At step 42, the power control module 30 analyzes DL channel conditions based on, for example, ULTPC commands transmitted by the UE. At step 43, if the DL channel conditions are poor (e.g., EU sent a series of ULTPC up commands), but received a series of DLTPC down commands from NodeB, the power control module 30 may determine that the DL channel is in a windup mode. At step 44, the power control module 30 may calculate DL noise power estimate for one or more TPC groups. At step 45, the power control module 30 may calculate Up and Down DLTPC rejection thresholds based on the noise power estimate. At step 46, the power control module 30 may reject an unreliable DLTPC down commands if the value of the DLTPC command is above the Up DLTPC rejection threshold. In another aspect, the power control module 30 may reject unreliable DLTPC up command if the value of the DLTPC command is below the down DLTPC rejection threshold. At step 47, the power control module 30 may instruct UE to maintain transmit power unchanged while the UE is in the windup mode. It should be noted that the method of FIG. 4 is exemplary only and that the steps thereof can be performed in different orders or by different components of the UE 10.

Figure 5:
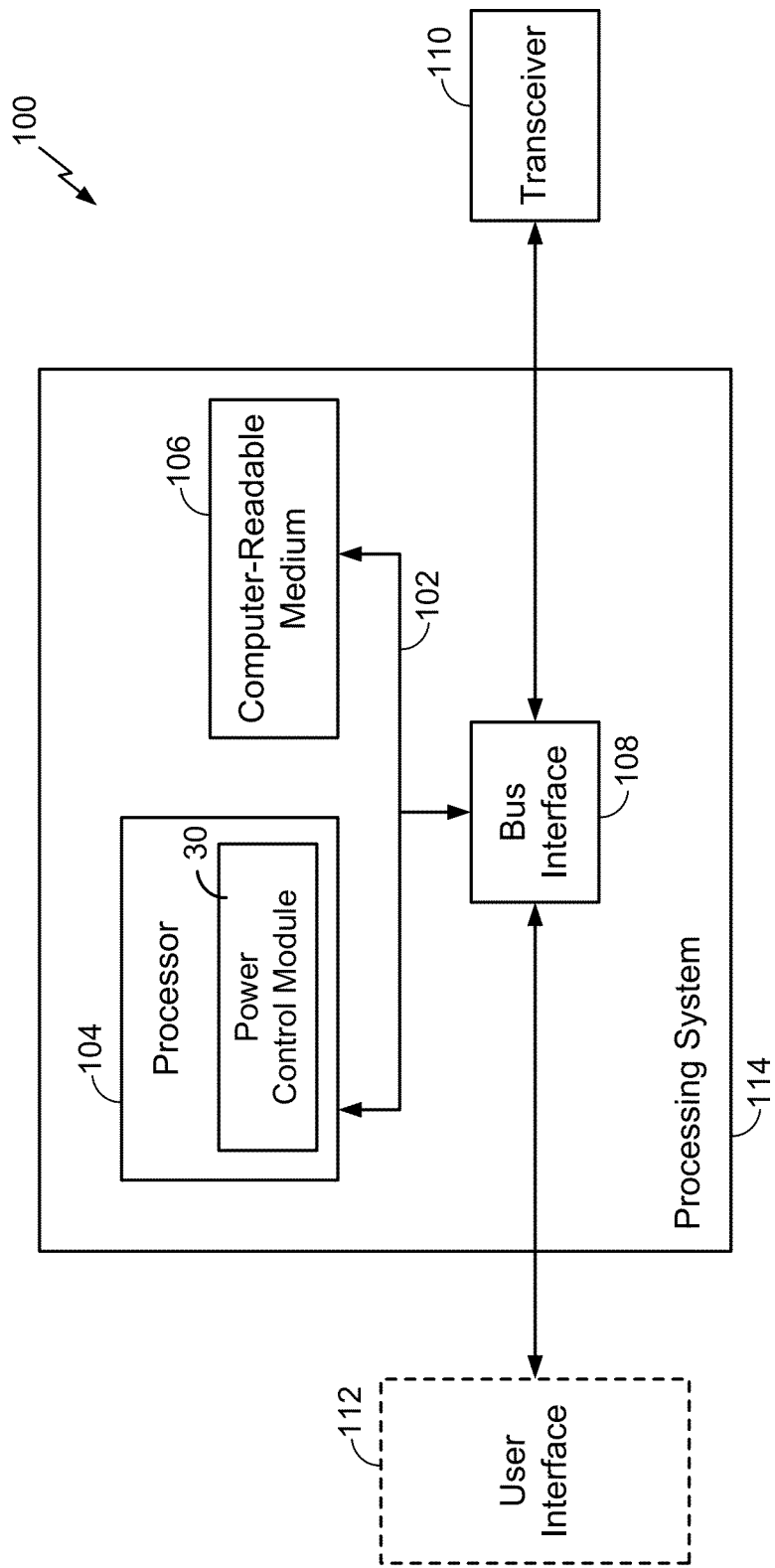
FIG. 5 is a block diagram illustrating an example of a hardware implementation for an apparatus employing a processing system.

FIG. 5 is a block diagram illustrating an example of a hardware implementation for an apparatus 100, such as an UE, employing a processing system 114. The apparatus 100 may be, for example, UE 10 of FIG. 2 and accordingly implement the methods and systems of FIGS. 2-4. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided. The processor 104 is responsible for managing the bus 102 and general processing, including the execution of software stored on the computer-readable medium 106. The software, when executed by the processor 104, causes the processing system 114 to perform the various functions described infra for any particular apparatus. In one aspect, the processing 104 may includes a power control module 30, which can be implemented as a set of instructions for calculating DLTPC rejection thresholds and using it to reject unreliable DLTPC commands. The computer-readable medium 106 may also be used for storing data that is manipulated by the processor 104 when executing software.

Figure 6:
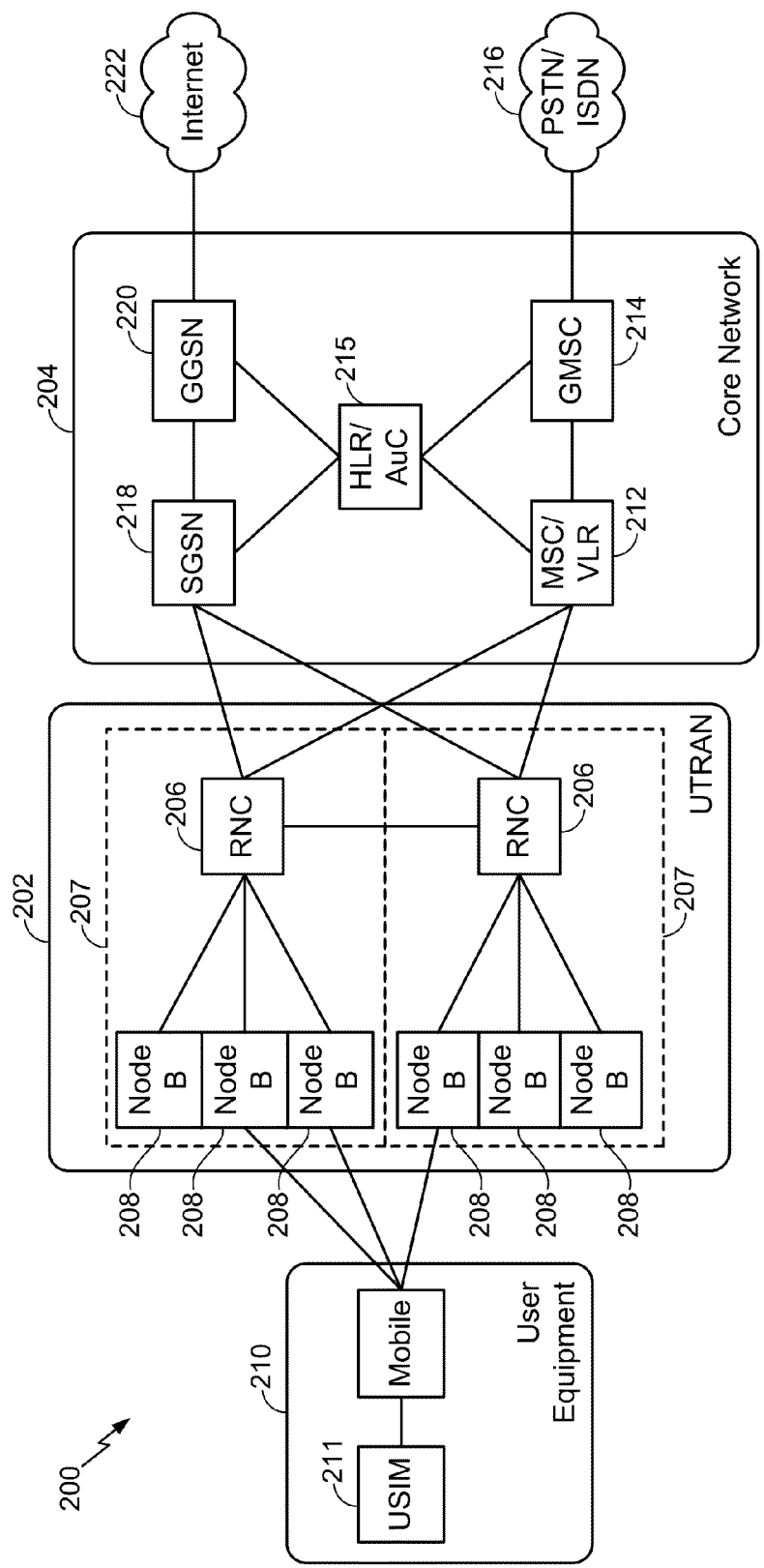
FIG. 6 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. UE 210 may be, for example, UE 10 of FIG. 2 and accordingly implement the methods and systems of FIGS. 2-4. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210, which may be UE 10 (FIG. 2), and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214.

In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
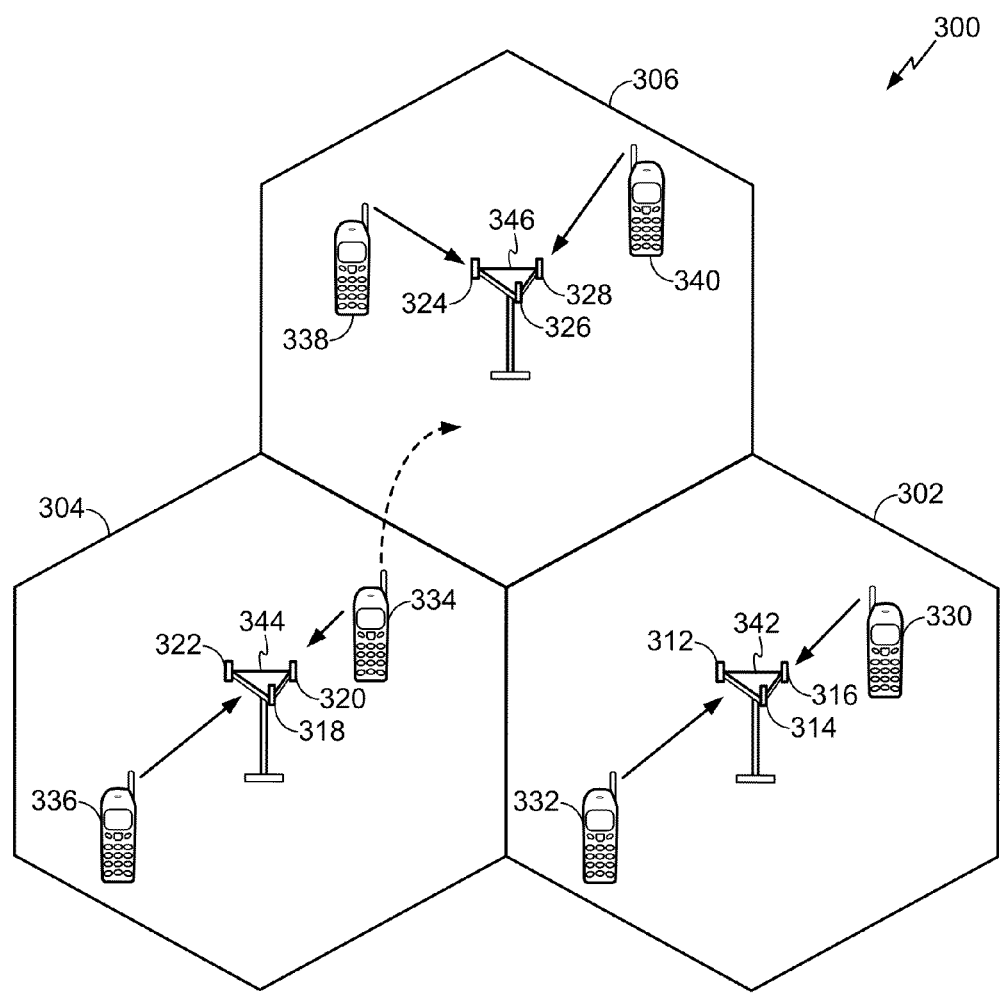
FIG. 7 is a conceptual diagram illustrating an example of an access network.

Referring to FIG. 7, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs, such as UEs 10 (FIG. 2) in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306. One or more or all of UEs 330, 332, 334, 336, 338, 340 may be UEs such as, for example, UE 10 of FIG. 2 and accordingly implement the methods and systems of FIGS. 2-4.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
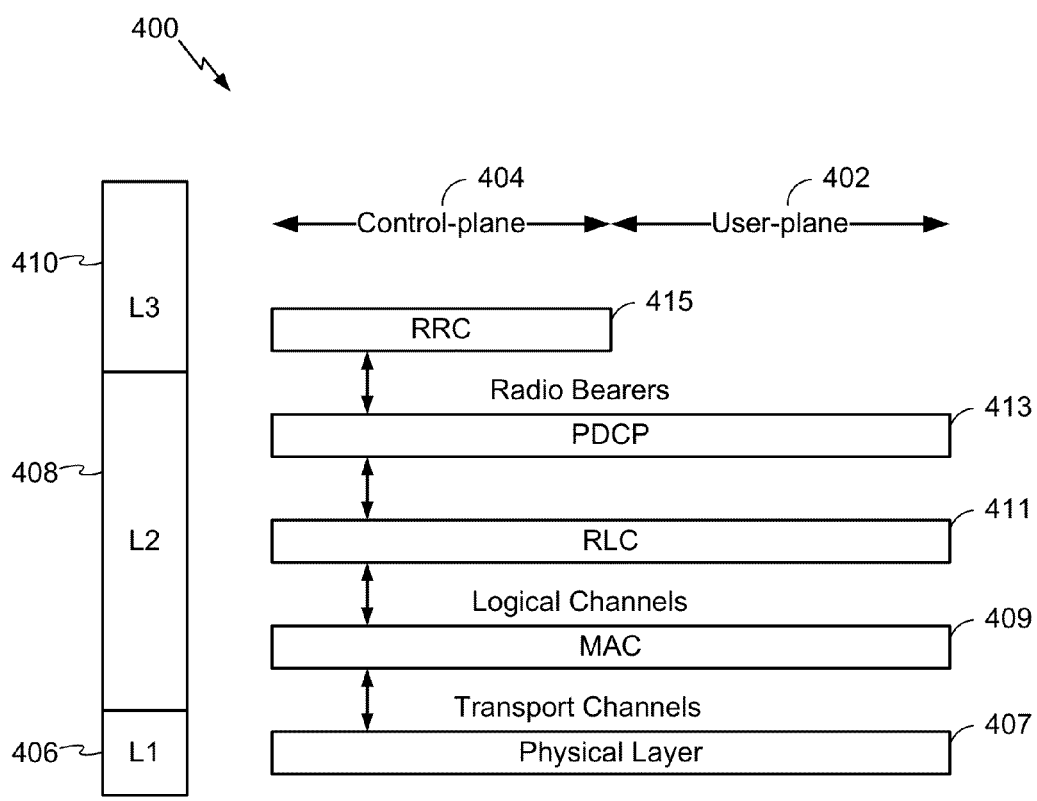
FIG. 8 is a conceptual diagram illustrating an example of a radio protocol architecture for the user and control plane.

The radio protocol architecture may take on various forms depending on the particular application. An example of an HSPA system will now be presented with reference to FIG. 8. As shown in FIG. 8, an example radio protocol architecture 400 relates to the user plane 402 and the control plane 404 of a UE or node B/base station. For example, architecture 400 may be included in a UE 10 (FIG. 2). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
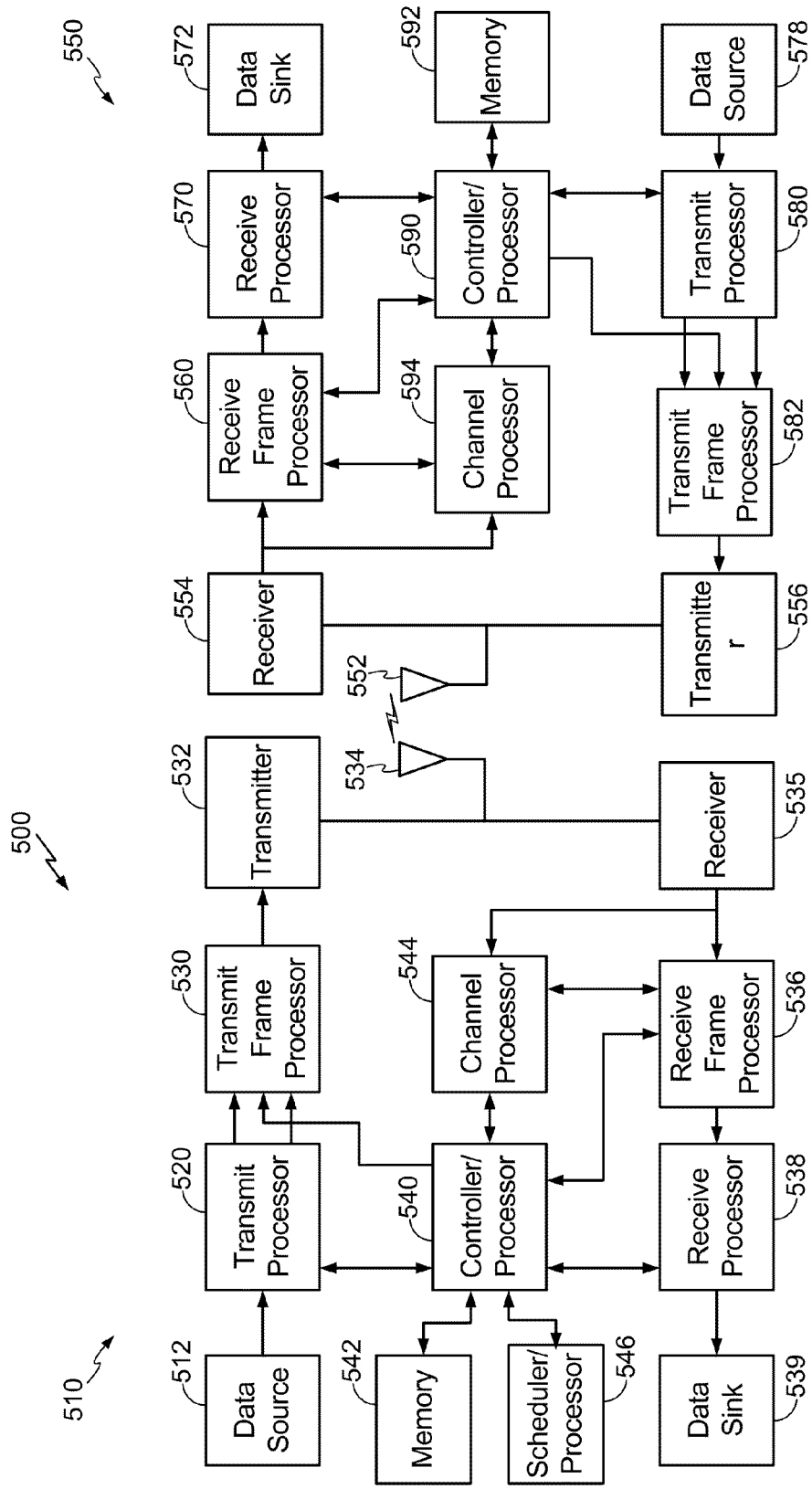
FIG. 9 is a block diagram conceptually illustrating an example of a Node B in communication with a UE in a telecommunications system.

FIG. 9 is a block diagram of a Node B 510 in communication with a UE 550, such as UE 10 (FIG. 2), where the Node B 510 may be the Node B 208 in FIG. 6, and the UE 550 may be the UE 210 in FIG. 6. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving one or more downlink (DL) transmit power control (TPC) down commands and one or more DLTPC up commands;
   analyzing DL channel conditions based on one or more transmitted uplink (UL) TPC commands;
   detecting a windup mode based on the DL channel conditions;
   rejecting a DLTPC down command from the one or more DLTPC down commands in the windup mode if a value of the DLTPC down command is greater than an up DLTPC rejection threshold; and
   rejecting a DLTPC up command from the one or more DLTPC up commands in the windup mode if a value of the DLTPC up command is less than a down DLTPC rejection threshold.

2. The method of claim 1, further comprising
   calculating a DLTPC rejection threshold based on the noise power estimate for one or more base stations.

3. The method of claim 2, wherein the DLTPC rejection threshold includes the down DLTPC rejection threshold and the up DLTPC rejection threshold.

4. An apparatus for wireless communication, comprising:
   at least one processor configured to:
      receive one or more downlink (DL) transmit power control (TPC) down commands and one or more DLTPC up commands;
      analyze DL channel conditions based on one or more transmitted uplink (UL) TPC commands;
      detect a windup mode based on DL channel conditions;
      reject a DLTPC down command from the one or more DLTPC down commands in the windup mode if a value of the DLTPC down command is greater than an up DLTPC rejection threshold; and
      reject a DLTPC up command from the one or more DLTPC up commands in the windup mode if a value of the DLTPC up command is less than a down DLTPC rejection threshold.

5. The apparatus of claim 4, wherein the processor being further configured to:
   calculate a DLTPC rejection threshold based on the noise power estimate for one or more base stations.

6. The apparatus of claim 5, wherein the DLTPC rejection threshold includes the down DLTPC rejection threshold and the up DLTPC rejection threshold.

7. An apparatus for wireless communication, comprising:
   means for receiving one or more downlink (DL) transmit power control (TPC) down commands and one or more DLTPC up commands;
   means for analyzing DL channel conditions based on one or more transmitted uplink (UL) TPC commands;
   means for detecting a windup mode based on the DL channel conditions;
   means for rejecting a DLTPC down command from the one or more DLTPC down commands in the windup mode if a value of the DLTPC down command is greater than an up DLTPC rejection threshold; and
   means for rejecting a DLTPC up command from the one or more DLTPC up commands in the windup mode if a value of the DLTPC up command is less than a down DLTPC rejection threshold.

8. The apparatus of claim 7, further comprising
   means for calculating a DLTPC rejection threshold based on the noise power estimate for one or more base stations.

9. The apparatus of claim 8, wherein the DLTPC rejection threshold includes the down DLTPC rejection threshold and the up DLTPC rejection threshold.

10. A non-transitory computer-readable medium storing executable code for wireless communications, comprising:
    code for receiving one or more downlink (DL) transmit power control (TPC) down commands and one or more DLTPC up commands;
    code for analyzing DL channel conditions based on one or more transmitted uplink (UL) TPC commands;
    code for detecting a windup mode based on the DL channel conditions;
    code for rejecting a DLTPC down command from the one or more DLTPC down commands in the windup mode if a value of the DLTPC down command is greater than an up DLTPC rejection threshold; and code for rejecting a DLTPC up command from the one or more DLTPC up commands in the windup mode if a value of the DLTPC up command is less than a down DLTPC rejection threshold.

11. The medium of claim 10, further comprising code for calculating a DLTPC rejection threshold based on the noise power estimate for one or more base stations.

12. The medium of claim 11, wherein the DLTPC rejection threshold includes the down DLTPC rejection threshold and the up DLTPC rejection threshold.

* * * * *